United States Patent Office 2,931,781
Patented Apr. 5, 1960

2,931,781

PROCESS FOR THE MANUFACTURE OF A POLY-GLYCIDYL ETHER OF A POLYHYDROXY-1:3:5-TRIAZINE

Walter Hofmann, Basel, and Paul Zuppinger, Arlesheim, Switzerland, assignors to Ciba Limited, Basel, Switzerland, a firm of Switzerland No Drawing. Application June 25, 1957
Serial No. 667,984

Claims priority, application Switzerland June 26, 1956

6 Claims. (Cl. 260—2)

It is known to react polyhydroxy-1:3:5-triazines, such as cyanuric acid, in the presence of an aqueous alkali with epichlorhydrin or a chlorhydrin which is capable of forming epichlorhydrin with alkali. In this manner there are obtained water-soluble polyhydroxy-compounds free from epoxide groups, namely triazine polyalcohols. There has also been described a process for making polyglycidyl ethers of 1:3:5-triazines. This process uses as starting materials halogen-1:3:5-triazines, and the latter are reacted in the presence of an alkali with a monohalogenhydrin or glycide with the formation of the corresponding polyglycidyl ether.

The present invention provides a process for the manufacture of a polyglycidyl ether of a polyhydroxy-1:3:5-triazine, which comprises heating a polyhydroxy-1:3:5-triazine with epichlorhydrin in the presence of a dry compound capable of binding hydrogen chloride, advantageously in the presence of sodium carbonate.

As polyhydroxy-1:3:5-triazines there are suitable di- and tri-hydroxy-1:3:5-triazines, such as 2-chloro-4:6-dioxy-1:3:5-triazine, 2-phenyl-4:6-dioxy-1:3:5-triazine (benzoguanamide), 2-amino-4:6-dioxy-1:3:5-triazine (ammelide) or more especially 2:4:6-trioxy-1:3:5-triazine (cyanuric acid).

Instead of using dry sodium carbonate, there may generally be used with slightly less success, for example, dry sodium hydroxide, potassium carbonate or an alkali metal aluminate, alkali metal silicate or alkali metal zincate or a mixture of two or more of these substances.

The process is generally carried out by heating a mixture of the triazine, epichlorhydrin and compound capable of binding hydrogen chloride under reflux for 2 to 24 hours, it being of advantage to remove the water formed during the reaction continuously from the reaction mixture by distillation. It is of advantage to use an excess of epichlorhydrin. In this manner the desired polyglycidyl ethers are obtained in good yield. Alternatively, the epichlorhydrin or the compound capable of binding hydrogen chloride may be added to a heated mixture of the other two components.

The reaction products so obtained are liquid to solid masses that are generally of a yellow to brownish color. The polyglycidyl ethers have a content of about 4 to 6 epoxide equivalents per kilogram, and also contain chlorhydrin groups. When it is desired to obtain products having a lower chlorine content, the polyglycidyl ethers may be subjected to a mild treatment with alkali, advantageously with a solution of potassium hydroxide in methanol. In this manner there are obtained products containing about 0.3 to 0.6 chlorine equivalent per kilogram.

The polyglycidyl ethers obtained by the process of this invention can be converted into hardened products by simple heating. The use of hardening agents, which are usually necessary with other compounds containing epoxide groups, can be dispensed with. However, valuable hardened products can also be obtained by using hardening agents of the kind used for hardening epoxy-resins, such as amines, especially alkylene polyamines, or carboxylic acids, especially aromatic polycarboxylic anhydrides. Thus, for example, by hardening with aromatic polycarboxylic anhydrides there are obtained products having especially high softening points.

The products can be used alone or in conjunction with hardening agents, in solution as impregnating agents for textiles, for example, cellulosic products, or fibers of polyamides, polyacrylonitrile or polyesters, or as coating compositions for coating metals, wood, glass etc. They are also suitable as thickening agents or binding agents in printing pastes or inks, and they are also useful as adhesives for materials of widely differing kinds, as stabilising agents for halogen-containing polyvinyl compounds, such as polyvinyl chloride or polyvinylidene chloride, or as, or for the production of, casting compositions or embedding compositions. They can also be used as modifying agents for polymerisable products, such as acrylic, vinyl or polyester resins, or hardenable resins such as aminoplasts or epoxy-resins. Furthermore, the products may be reacted with compounds containing reactive groups, for example, with saturated or unsaturated fatty acids.

The following examples illustrate the invention, the parts and percentages being by weight.

*Example 1*

129 parts (1 mol) of cyanuric acid are heated to the boil in an oil bath heated at about 160° C. with 833 parts (9 mols) of epichlorhydrin and 159 parts (1.5 mols) of dry powdered sodium carbonate, the water of reaction being continuously distilled azeotropically from the reaction mixture. The epichlorhydrin which also distils over is separated from the water in a separator and returned continuously to the reaction mixture. The reaction ceases in about 16 hours. The reaction solution is filtered to remove precipitated sodium chloride, and the filtrate is freed from excess of epichlorhydrin by evaporation in vacuo. There are obtained 293 parts of a resin containing 4.18 epoxide equivalents per kilogram and 2.70 chlorine equivalents per kilogram. The resin so obtained can be heated for 7 hours at 150° C., whereby it hardens to an insoluble mass.

In order to obtain a product having a lower chlorine content, 31.5 parts of the polyglycidyl ether obtained as described above are dissolved at 60° C. in 25 parts by volume of glycol monomethyl ether, the solution is cooled to room temperature, and an approximately 2 N-solution of potassium hydroxide in methanol is added in portions until the solution no longer undergoes decolorization when phenolphthalein is added. The solution is freed from potassium chloride and then concentrated in vacuo on a steam bath, the solution being repeatedly filtered to remove further precipitated potassium chloride. Finally, the solution is evaporated to a constant weight. There are obtained 29 parts of a resin having 5.75 epoxide equivalents per kilogram and 0.60 chlorine equivalent per kilogram.

*Example 2*

129 parts (1 mol) of cyanuric acid are reacted with 1110 parts (12 mols) of epichlorhydrin and 159 parts (1.5 mols) of dry sodium carbonate as described in Example 1. There is obtained a resin having a content of 5.31 epoxide equivalents per kilogram and 2.34 chlorine equivalents per kilogram.

To 100 parts of the resulting polyglycidyl ether there are added at 80° C. 23 parts of phthalic anhydride and 42 parts of tetrahydrophthalic anhydride. The mass is hardened at 120° C. for 16 hours, whereby a resin is obtained having a thermal stability of 119° C. according to Martens VSM.

By using, instead of carboxylic anhydrides, amines such as diethylaminomethyl-phenol or triethanolamine, there is obtained a pourable mass which yields clear bright castings after being hardened for 4–10 hours at 90° C.

*Example 3*

64.5 parts (0.5 mol) of cyanuric acid, 555 parts (6 mols) of epichlorhydrin and 79.5 parts (0.75 mol) of sodium carbonate are heated under reflux for 16 hours at an oil bath temperature of about 160° C. After freeing the solution from precipitated sodium chloride by filtration, the filtrate is worked up as described in Example 1, and there are obtained 135 parts of a pale yellow highly viscous resin having a content of 4.82 epoxide equivalents per kilogram and 2.42 chlorine equivalents per kilogram, which represents a yield of resin of 91%.

100 parts of the resulting polyglycidyl ether are esterified in known manner with 100%, 120%, 140% and 200% of linoleic acid, respectively. After diluting the esterification products with xylene to a dry content of 50%, and adding a cobalt drier and lead drier in proportions amounting to 0.04% of cobalt and 0.4% of lead, respectively, the resulting compositions, when applied to the surfaces of supports, form lacquer films which are dust dry in 75 minutes.

*Example 4*

18.9 parts (0.1 mol) of benzoguanamide, 74 parts (0.8 mol) of epichlorhydrin and 10.6 parts (0.1 mol) of sodium carbonate are heated under reflux for 14 hours in an oil bath having a temperature of about 160° C. By working up as described in Example 1, there are obtained 56 parts of a dark brown almost solid resin having a content of 0.12 epoxide equivalent per kilogram and 3.12 chlorine equivalents per kilogram.

By using, instead of 0.8 mol of epichlorhydrin, 1 mol thereof, heating the mixture for 5 hours and continuously removing the reaction water from the reaction mixture, there is obtained a resin having 1.70 epoxide equivalents per kilogram and 2.10 chlorhydrin equivalents per kilogram.

What is claimed is:

1. A single step process for the manufacture of a polyglycidyl ether of a polyhydroxy-1:3:5-triazine which comprises heating a polyhydroxy-1:3:5-triazine containing 2 to 3 hydroxyl groups with epichlorhydrin in the presence of a dry anhydrous substance capable of binding hydrogen chloride at the boiling temperature of the reaction mixture, said dry-anhydrous substance being selected from the class consisting of alkali metal hydroxides, alkali metal carbonates, alkali metal aluminates, alkali metal silicates and alkali metal zincates and mixtures thereof.

2. A single step process for the manufacture of a polyglycidyl ether of a polyhydroxy-1:3:5-triazine which comprises heating a polyhydroxy-1:3:5-triazine containing 2 to 3 hydroxyl groups with epichlorhydrin in the presence of dry anhydrous sodium carbonate at the boiling temperature of the reaction mixture.

3. A single step process for the manufacture of a polyglycidyl ether of a polyhydroxy-1:3:5-triazine which comprises heating a polyhydroxy-1:3:5-triazine containing 2 to 3 hydroxyl groups with epichlorhydrin in the presence of a dry anhydrous substance capable of binding hydrogen chloride at the boiling temperature of the reaction mixture, the water formed during the reaction being distilled off continuously, said dry-anhydrous substance being selected from the class consisting of alkali metal hydroxides, alkali metal carbonates, alkali metal aluminates, alkali metal silicates and alkali metal zincates and mixtures thereof.

4. A single step process for the manufacture of a polyglycidyl ether of a polyhydroxy-1:3:5-triazine which comprises heating a polyhydroxy-1:3:5-triazine containing 2 to 3 hydroxyl groups with epichlorhydrin in the presence of dry anhydrous sodium carbonate at the boiling temperature of the reaction mixture, the water formed during the reaction being distilled off continuously.

5. A single step process for the manufacture of a polyglycidyl ether of cyanuric acid which comprises heating cyanuric acid with epichlorhydrin in the presence of dry anhydrous sodium carbonate at the boiling temperature of the reaction mixture.

6. A single step process for the manufacture of a polyglycidyl ether of cyanuric acid which comprises heating cyanuric acid with epichlorhydrin in the presence of dry anhydrous sodium carbonate at the boiling temperature of the reaction mixture, the water formed during the reaction being distilled off continuously.

References Cited in the file of this patent

UNITED STATES PATENTS

| | | |
|---|---|---|
| 2,244,421 | Ericks | June 3, 1941 |
| 2,381,121 | Ericks | Aug. 7, 1945 |
| 2,528,360 | Greenlee | Oct. 31, 1950 |
| 2,741,607 | Bradley et al. | Apr. 10, 1956 |
| 2,809,942 | Cooke | Oct. 15, 1957 |